Feb. 11, 1969     R. L. GREENBERG     3,426,502
BOX-TREATING APPARATUS
Filed Sept. 16, 1965     Sheet 1 of 6
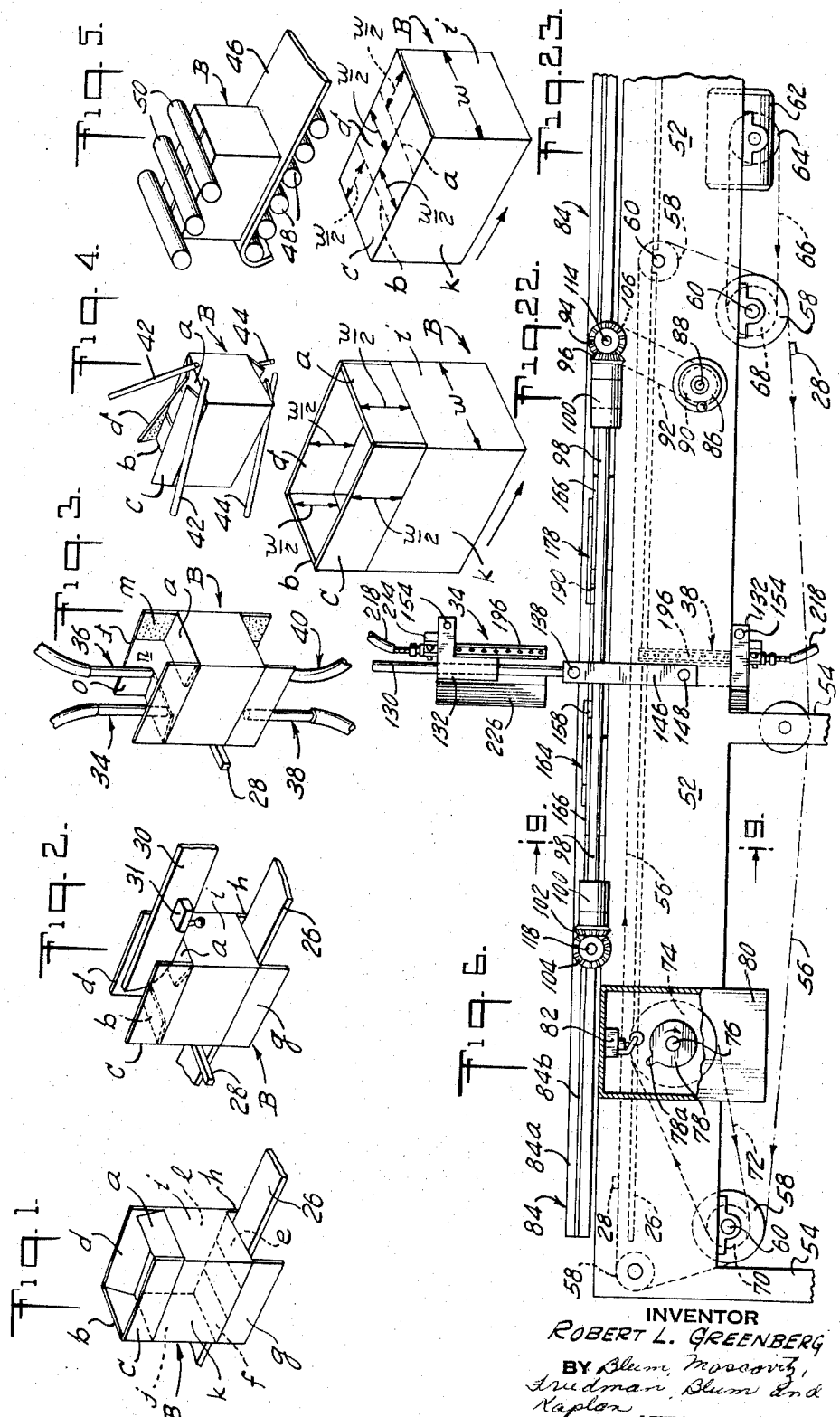
INVENTOR
ROBERT L. GREENBERG
BY Blum, Moscovitz, Friedman, Blum and Kaplan
ATTORNEYS

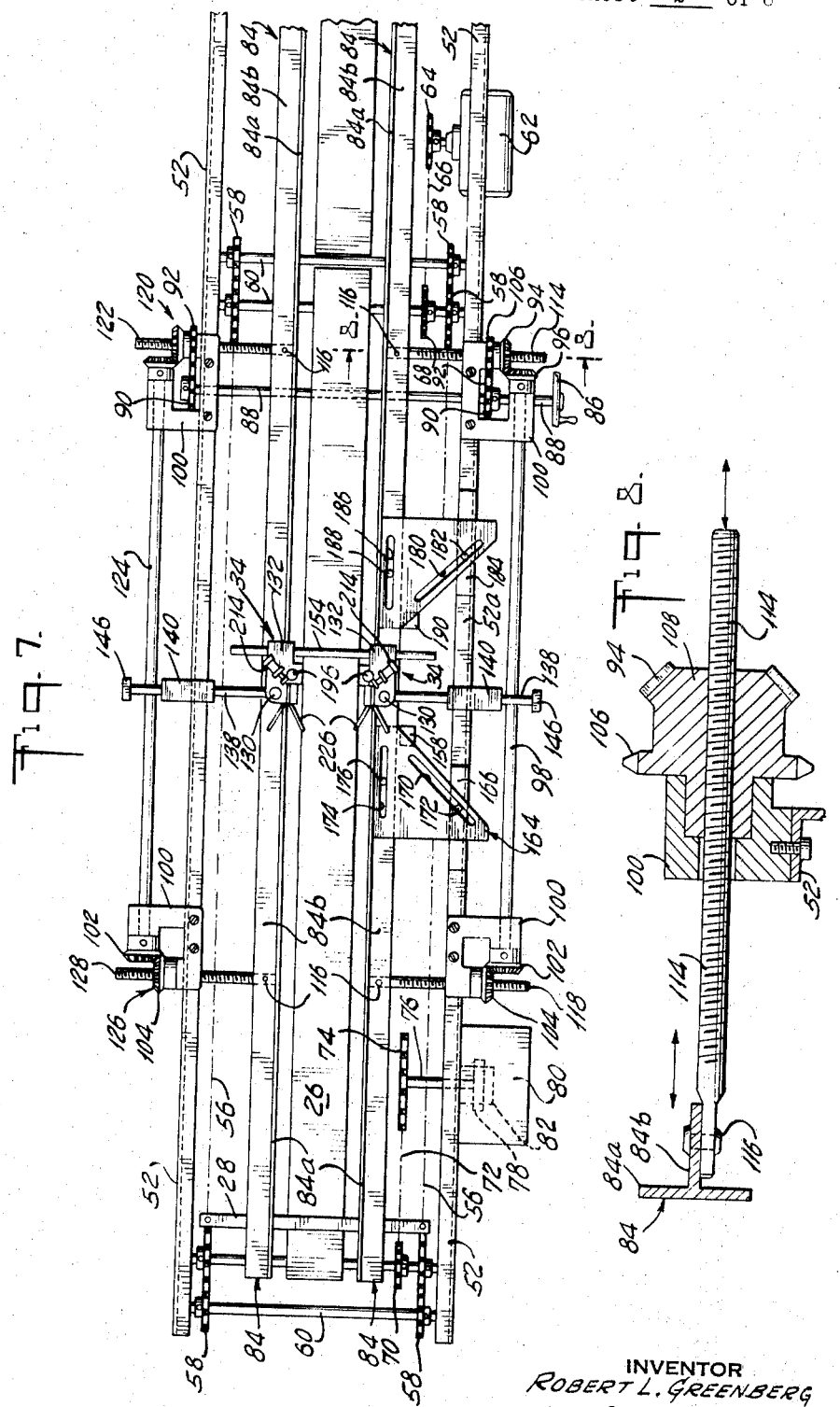

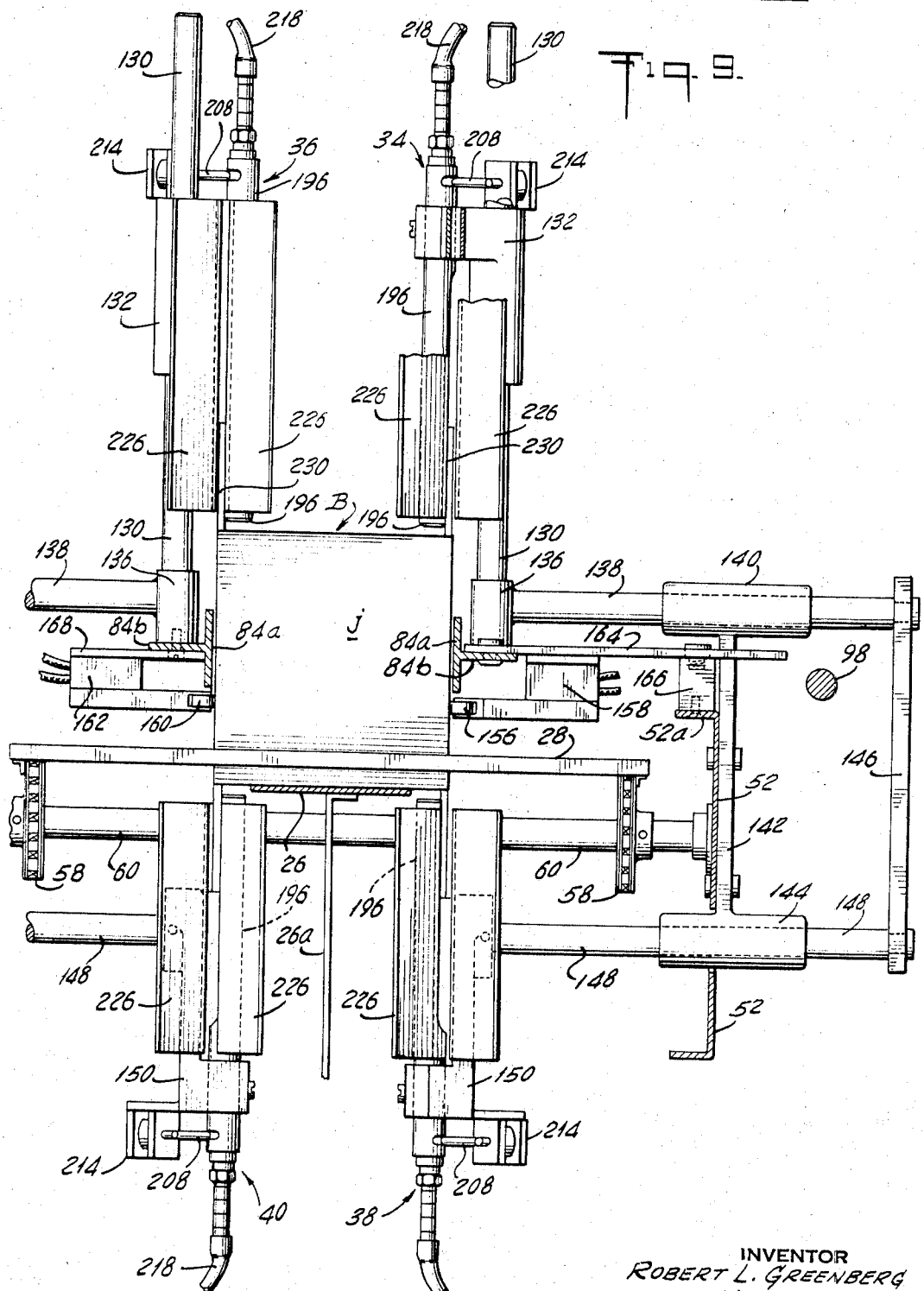

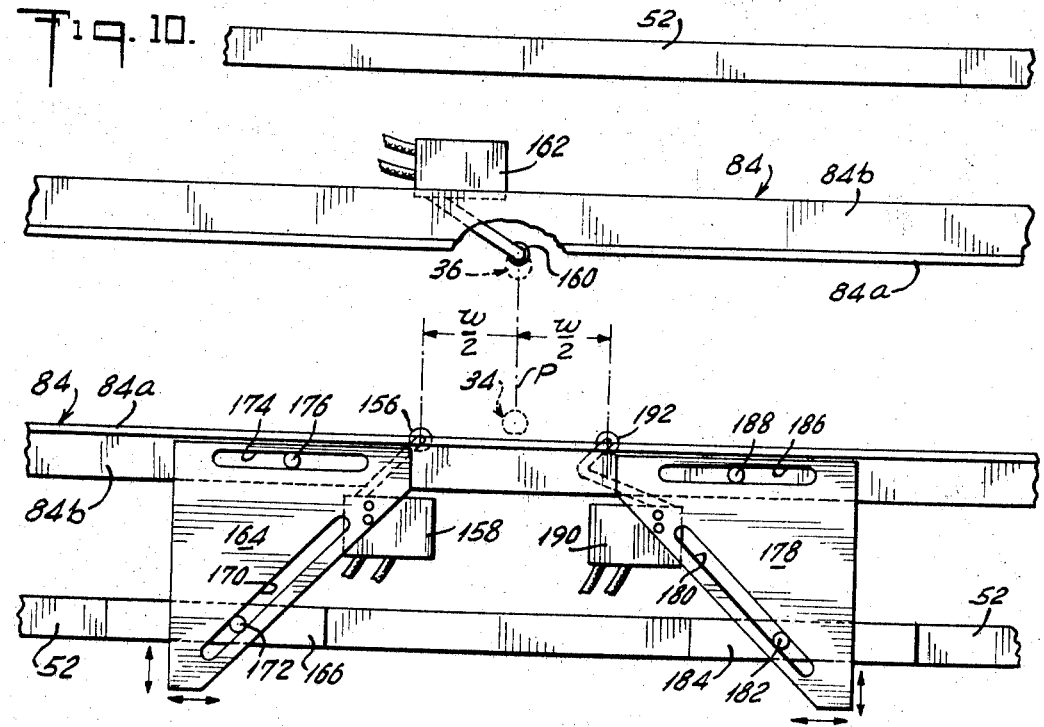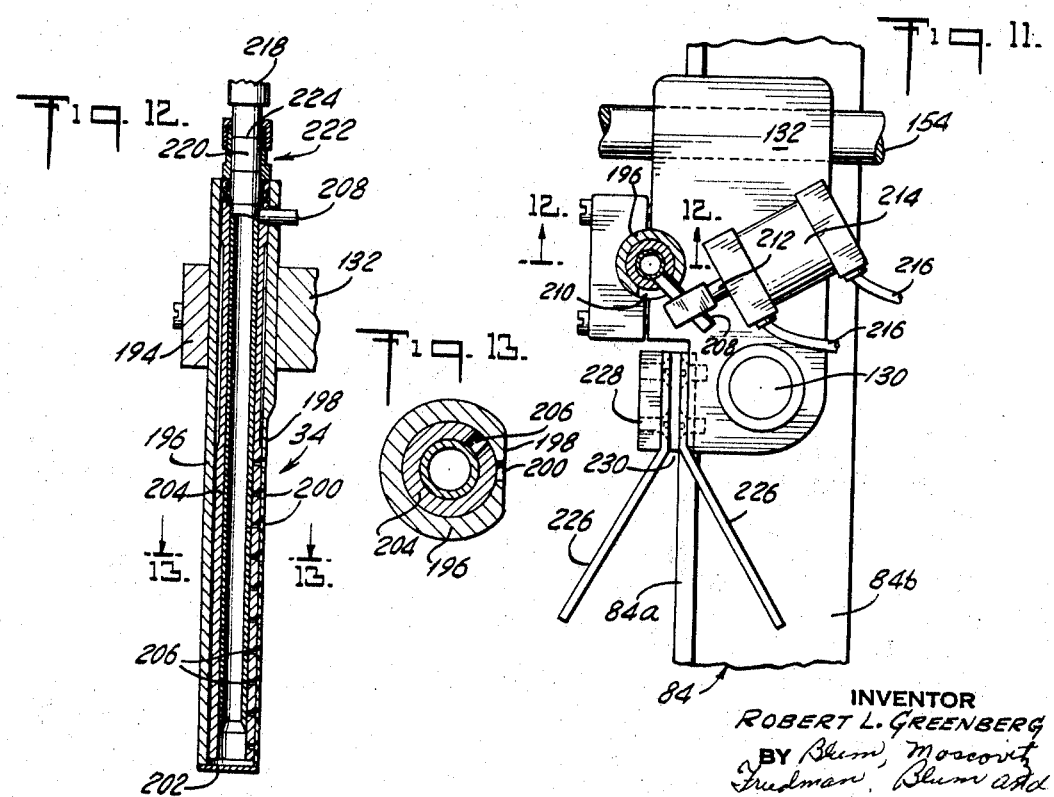

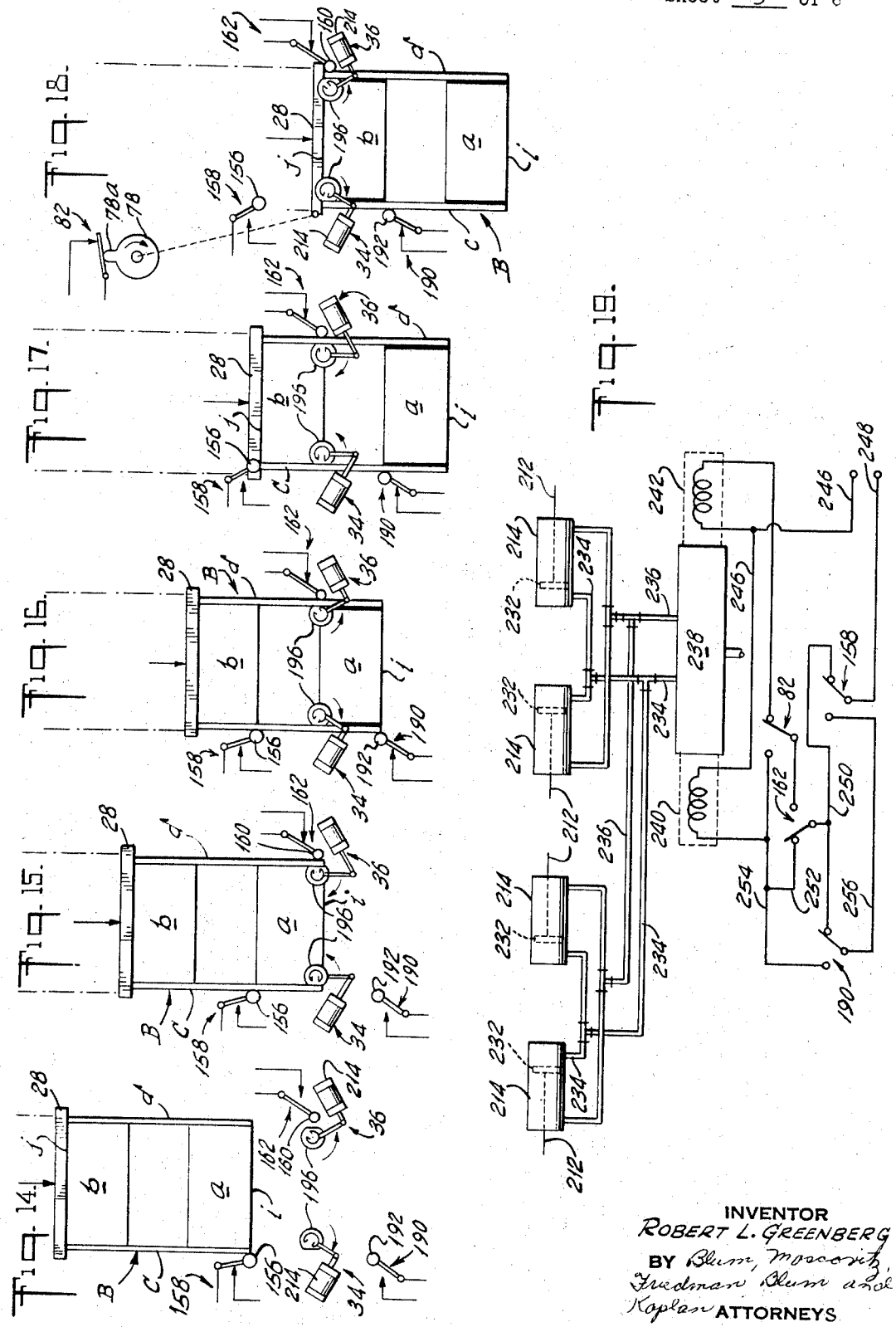

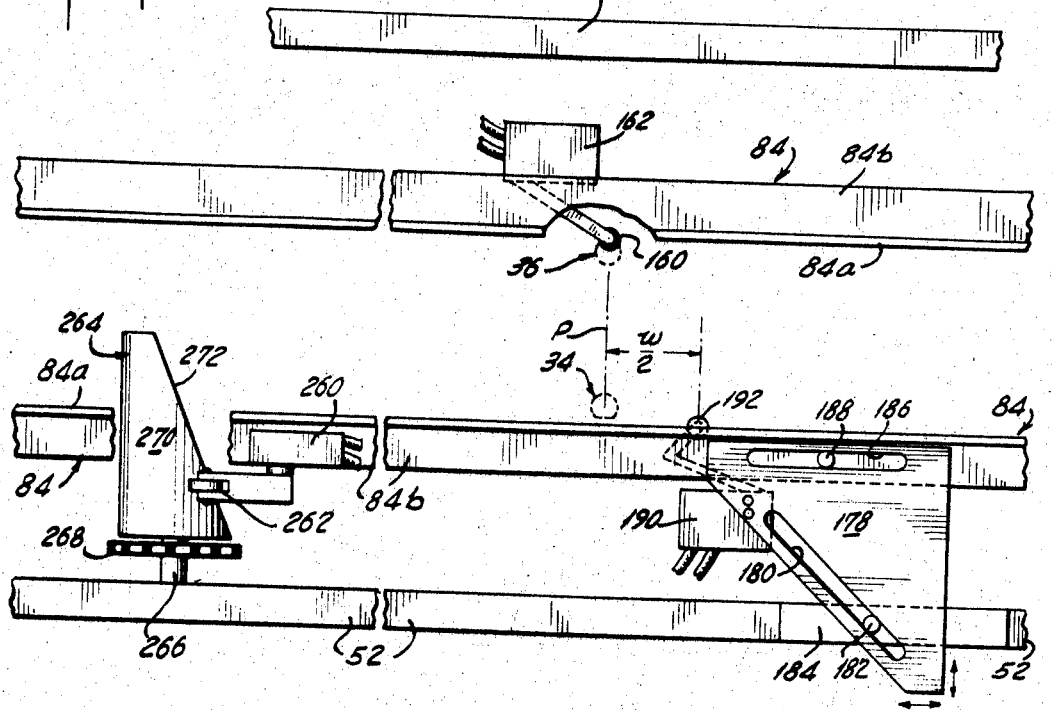

United States Patent Office 3,426,502
Patented Feb. 11, 1969

3,426,502
BOX-TREATING APPARATUS
Robert L. Greenberg, Englewood, N.J., assignor to National Equipment Corporation, a corporation of New York
Filed Sept. 16, 1965, Ser. No. 487,781
U.S. Cl. 53—75                                             19 Claims
Int. Cl. B67b 57/02, 7/20; B05c 11/00

ABSTRACT OF THE DISCLOSURE

A carton sealing apparatus for adhesively connecting outer flaps of a carton to inner flaps thereof. A transporting means is provided for transporting a carton in a given direction along a predetermined path where a normally closed adhesive-applying means is situated for applying adhesive to at least a pair of the carton flaps during movement thereof. An adjustable control means coacts with the adhesive-applying means to open and close the latter, and an adjustable guide means for the carton is adjustable transversely of the direction of movement thereof. An adjusting means which acts to adjust the guide means to accommodate the latter to the dimensions of a particular carton actuates through the guide means an automatic adjusting means which coacts with the control means to adjust the latter for controlling the opening and closing of the adhesive-applying means in accordance with the adjustment of the guide means.

---

The present invention relates to box-treating or carton sealing apparatus.

In particular, the present invention relates to apparatus to be used in conjunction with the sealing of cartons which have been filled with any desired goods.

Cartons or boxes of this type conventionally include flaps which are adhesively secured to each other, and the present invention relates particularly to that part of a carton sealing apparatus where the adhesive is applied to the carton flaps in preparation for subsequently securing the flaps to each other when the carton is closed. With structures of this type whenever the machine is adjusted from one carton size to a different carton size, a considerable amount of inconvenience is encountered in carrying out an entire series of adjustments which must be made for this purpose. Thus, it is not only a matter of adjusting the structure which guides a carton of a given size through the carton sealing apparatus, in addition it is essential to adjust the structure which acts on the carton, and this latter structure, of course, includes the structure which applies the adhesive to the carton. A great deal of inconvenience is encountered with conventional structures in connection with adjusting the adhesive-applying structure when changing from one carton size to another carton size. The adjusting of the adhesive-applying structure for a given carton requires in most cases more than a simple adjustment of the time when the application of adhesive is started and stopped. Generally the carton flaps will require adhesive to be applied to a plurality of different areas thereof, so that for each carton, it is necessary to start and stop the application of adhesive more than once, and thus a considerable amount of complications are involved in carrying out such adjustments. These adjustments can either be made manually or suitable cams, whose configurations are empirically determined for a given box can be used for such purposes, but in either event a considerable amount of expense and time is involved either in connection with the manual adjustments or in connection with the cost of preparing different cams for different boxes and of course connecting and disconnecting such cams.

It is therefore a primary object of the present invention to provide a box-treating structure which is capable of being adjusted to handle boxes of different sizes while very greatly reducing the inconvenience involved when changing over from one box size to another box size, but at the same time avoiding the use of expensive cams or the like.

In particular, it is an object of the present invention to provide a structure which takes advantage of the proportions which are encountered in boxes so as to use these proportions in a fully automatic manner for adapting the stopping and starting of the application of adhesive to a particular box whenever the box-guiding structure is adjusted to accommodate a box for a given size.

In particular, it is an object of the present invention to provide a structure where only a single manual adjustment is required when changing from one box size to another box size, and all other adjustments take place automatically so that a minimum of time and inconvenience is encountered in changing over from one box size to another box size.

In addition, the object of the present invention includes the provision of an apparatus capable of accomplishing the above objects while at the same time being composed of simple rugged elements which are very reliable in operation and which provide a compact assembly requiring a small amount of space.

Primarily with the apparatus of the present invention there will be, in addition to a transporting means for transporting in a given direction along a given path a box which has outer flaps required to be secured to inner flaps, an adhesive means situated along the path of movement of the box for applying adhesive to at least two of these flaps, guide means guiding the box while it is transported along its path of movement, and, in accordance with the present invention, a pair of adjusting means. One of these adjusting means is manually operated and is connected with the guide means for adjusting the latter according to the dimension of the box transversely of its path of movement. The other of the adjusting means is fully automatic and operates in response to manual adjustment of the guide means. A control means is provided to control the opening and closing of the adhesive-applying means, and this control means is adjusted by the automatic adjusting means, in response to adjustment of the guide means transversely of the path of travel of the box, for accurately and reliably adjusting the adhesive-applying means to apply adhesive to the box flaps in precisely the right manner whenever the guide means is adjusted to a box of a different size.

The invention is illustrated by way of example in the accompanying drawings which form part of the application and in which:

FIGS. 1–5 respectively illustrate a series of stages in the treatment of a box subjected, during part of its treatment, to handling by the apparatus of the present invention;

FIG. 6 is a partly sectional longitudinal elevation of one possible embodiment of an apparatus according to the present invention as seen from the side;

FIG. 7 is a top plan view of the structure of FIG. 6;

FIG. 8 is a transverse sectional elevation, on an enlarged scale as compared to FIG. 7, showing part of a screw transmission of a manually operable adjusting means of the present invention;

FIG. 9 is a transverse sectional elevation taken on line 9—9 of FIG. 6 in the direction of the arrows and showing on an enlarged scale the structure at the region where the adhesive is applied to the box flaps;

FIG. 10 is a fragmentary plan view schematically illustrating an automatic adjusting structure of the present invention as well as part of the structure for controlling the adhesive-applying means;

FIG. 11 is a fragmentary top plan view showing in a partly sectional manner a suitable adhesive-applying structure;

FIG. 12 is a sectional elevation taken along line 12—12 of FIG. 11 to show further details of the adhesive-applying structure;

FIG. 13 is a sectional plan view taken along line 13—13 of FIG. 12 in the direction of the arrows and showing also part of the adhesive-applying structure;

FIGS. 14–18 respectively illustrate schematically a sequential series of actuations of the control structure which take place during movement of a control along the sealing apparatus of the present invention;

FIG. 19 is a schematic diagram of the electrical and fluid-pressure circuitry of one possible embodiment of the structure of the invention;

FIG. 20 is a schematic top plan view illustrating another embodiment of a control structure of the invention for controlling the adhesive-applying means;

FIG. 21 is a schematic wiring and fluid-pressure circuit illustration of the embodiment of FIG. 20;

FIG. 22 is a perspective view of a carton with open flaps; and

FIG. 23 is a perspective view of a carton with closed flaps.

Referring now to the drawings, and to FIG. 1 in particular, the type of carton which is sealed with the apparatus of the invention includes upper inner flaps $a$ and $b$ which are adapted to be situated, when the carton is closed, beneath the upper outer flaps $c$ and $d$ which are adhesively secured to the inner upper flaps $a$ and $b$. In the same way the carton B includes at its lower end inner flaps $e$ and $f$ and lower outer flaps $g$ and $h$ which are adapted to be adhesively secured to the inner flaps $e$ and $f$. In the illustrated example, the carton B is moving toward the right, as viewed in FIG. 1, so that it has a leading end $i$ and a trailing end $j$, and of course the carton is completed by the opposite sides $k$ and $l$.

The carton B is transported by a transporting means which includes a slide plate 26 extending in a horizontal plane and on which the carton rests while being capable of sliding along the upper surface thereof during transportation of the carton. The transporting means includes in addition to the plate 26 which slidably supports the carton during its movement a pusher bar 28 shown in FIG. 2 which engages the trailing end $j$ of the carton, and the pusher bar 28 extends across the slide plate 26 spaced from and situated over the latter while engaging the trailing end $j$ of the carton B so as to advance the latter along the slide plate 26.

Although it is possible to automatically deliver filled cartons to a structure such as the slide plate 26, in the illustrated example the carton will be placed in the position shown in FIG. 1 on the slide plate 26 and articles will be filled into the carton while the lower inner flaps $e$ and $f$ are maintained by the upper surface of the slide plate 26 in the position illustrated in FIG. 1. After the carton has been suitably filled the machine of the invention will operate to transport the box in a path along which the slide plate 26 extends, and the operator will turn the upper inner flap $b$ downwardly while advancing the carton into engagement with microswitch 31 to close the latter and thus start the drive which advances bar 28. Flap $a$ is held down by bar 30, and the operator holds flap $b$ down until it rides beneath bar 30. In this way, the box will be transported with the upper flaps $a$ and $b$ held down in the condition indicated in FIGS. 2 and 3.

As may be seen from FIG. 3 during the transportation of the box B it will reach adhesive-applying units 34, 36, 38 and 40 which respectively are capable of applying adhesive to the box flaps $c$, $d$, $g$ and $h$ all of which, it will be noted, extend in the direction of travel of the box B.

It is particularly to be noted that the adhesive-applying devices do not apply adhesive over the entire inner areas of the flaps. Thus, as is shown most clearly for the flap $d$ in FIG. 3, the unit 36 will first apply the adhesive over the area $m$ which has along the length of the flap $d$, starting from its leading end, a dimension substantially equal to the dimension of the flap $a$ in the direction of travel of the box, so that when the flap $d$ is subsequently folded down there will be adhesive only at the area $m$ to engage the flap $a$. The area $n$ of the flap $d$, at its inner surface, is free of any adhesive so that any articles within the box situated in alignment with the gap between the leading and trailing inner upper flaps $a$ and $b$ will not become contacted by any adhesive material. However, the area $o$ at the inner face of the flap $d$ which will subsequently become situated over the trailing flap $b$ must again have glue or other adhesive applied thereto by the unit 36. Therefore it is clear that with this structure shown in FIG. 3 the several adhesive-applying units are required to apply adhesive to areas at the inner faces of the flaps which extend in the direction of travel and which in the illustrated example are the outer flaps at areas which will be situated over the inner flaps but not at areas, such as the area $n$ of the flap $d$, which become situated over the gap between the inner flaps. As a result it is essential to control the adhesive-applying means in such a way that the application and termination of the application of adhesive will apply adhesive only to those areas of the outer flaps which will be situated next to the inner flaps. Thus it becomes necessary to stop and start the operation of each of the units 34, 36, 38 and 40 twice for each passage of a box through the machine.

After the adhesive has been applied to the inner faces of the outer box flaps, the box is transported in a known manner beyond the slide plate 26 and into engagement with flap-folding rods 42 and 44 shown in FIG. 4, so that now the outer flaps are folded against the inner flaps, and thereafter each box B is received on an endless belt 46 and situated between rollers 48 and 50, as shown in FIG. 5, so that the adhesive will have an opportunity to set while the flaps are held in the position closing the box as illustrated in FIG. 5.

The present invention deals primarily with that phase of the box treatment which is illustrated in FIG. 3. The other phases which are diagrammatically illustrated in FIGS. 1, 2, 4 and 5 are disclosed in U.S. Patent No. 2,691,260, to which reference may be had for more details on these phases of the box treatment which do not relate to the present invention.

Referring now to FIG. 6, the machine of the invention illustrated therein includes a frame means part of which is formed by a side frame member 52 which is fragmentarily illustrated in FIG. 6 and which includes upstanding portions 54 adapted to engage at their unillustrated lower ends a suitable floor which carries the entire machine.

The transporting means which transports the boxes in a given direction, which is from the left toward the right in FIG. 6, along a predetermined path, and it will be noted that the slide plate 26 extends along this path, includes a pair of endless chains 56 one of which is indicated in FIG. 6. Each endless chain is guided over a series of sprocket wheels 58 carried by rotary shafts 60 which are supported for rotation by suitable bearings carried by the frame plates 52. Two transverse pusher bars 28 extend between and are carried by the pair of coextensive chains 56, and these bars 28 are uniformly spaced from each other along the endless chains in the manner indicated in FIG. 6. FIG. 6 also illustrates how the elevation of the upper runs of the endless chains 56 is such that the transverse pusher bars 28 will be situated at an elevation somewhat higher than the slide plate 26.

Whenever a box is filled so that the treatment thereof should be started, the operator will close an unillustrated circuit which will energize a driving motor 62 indicated at the lower right of FIG. 6, and this motor 62 drives a shaft which is supported in a suitable bearing and carries a rotary sprocket 64. This sprocket drives an endless chain 66 which transmits the drive to a sprocket 68 carried by the lower right shaft 60 of FIG. 6, and in this way the drive is transmitted from the sprocket 68 to the lower right sprocket 58 which serves to drive the chain 56 which is driven over the several additional sprockets 58 in the manner shown in FIG. 6. Of course, the shafts 60 extend across the machine to transmit the drive to the second set of sprockets 58 and the other chain 56 which is coextensive with the chain 56 indicated in FIG. 6, so that in this way the pair of equidistantly spaced pusher bars 28 are moved in the direction of the arrows indicated in FIG. 6.

The lower left rotary shaft 60 of FIG. 6 carries a sprocket 70 which drives a chain 72 guided around an additional sprocket 74 mounted on a rotary shaft 76 carried by the plate 52 which is visible in FIG 6. This shaft 76 extends through a suitable bearing to the side of the plate 52 which is visible in FIG. 6, and at this side of the plate 52 the shaft 76 carries a rotary cam 78 situated in a control box 80 also carried by the side plate 52 which is visible in FIG. 6. Within this control box 80 is situated a microswitch 82 adapted to be closed by the rotary cam 78 when its camming portion illustrated in FIG. 6 reaches at least approximately the uppermost part of its travel. As may be seen from FIG. 6 the cam 78 rotates in a clockwise direction so that the camming portion 78a of the cam 78 is approaching and about to engage the switch 82 for closing the latter. In this connection it is to be noted that the pusher bar 28 which is carried by the upper runs of the chains 56 and is situated to the left of the adhesive-applying units 34 and 38 indicated in FIG. 6 is approaching the location of these adhesive-applying units, and the transmission ratio is such that the cam 78 will close the switch 82 at a predetermined instant just before the pusher bar 28 shown in FIG. 6 reaches the location of the units 34 and 38, as well as the other adhesive-applying units, for a purpose described below. The same operations will take place when the other pusher bar approaches the location of the adhesive applying units. Thus, the spacing between the pusher bars is equal to the distance traveled by a point on a chain 56 during the completion of one full cycle of operations. In other words, one revolution of shaft 76 is equal to one cycle of the carton pusher bars 28 or one rev/carton.

The sides $k$ and $l$ of each carton B are guided at their exterior surfaces by a guide means which includes a pair of guide bars extending longitudinally along the machine in the direction of travel of the cartons. One of these guide bars 84 is visible in FIG. 6, and the structure includes the structure for laterally adjusting the guide bars to accommodate them to the size of the particular carton B which is being sealed. The adjusting structure for adjusting the position of the guide bars is operator-actuated and can be manually operated or motorized, and in the illustrated example includes a rotary hand wheel 86 which turns a shaft 88 supported for rotary movement by a bearing carried by the sidewall 52 of the machine. This shaft 88 rotates a sprocket 90 which transmits the drive to a chain 92 which in turn drives another sprocket coaxial with and fixed to a rotary bevel gear 94 which meshes with a second bevel gear 96 carried by a rotary shaft 98 which extends longitudinally along the machine and which is supported for rotation in bearings 100 which are carried by the side frame plate 52. This shaft 98 is in turn fixed with a rotary bevel gear 102 which meshes with a second bevel gear 104, so that the gears 94 and 104 will turn simultaneously so as to adjust the guide bar 84 in a manner described in greater detail below.

The above-described structure of FIG. 6 is shown in plan view in FIG. 7 while one of the units for adjusting one of the guide bars 84 is shown in part in detail and in section on an enlarged scale in FIG. 8. Referring to FIGS. 7 and 8, it will be seen that the sprocket chain 92 which is driven by rotation of the shaft 88 meshes with a sprocket wheel 106 (FIG. 8) which forms part of a block 108 with which the bevel gear 94 is integrally formed. The bearing assembly 100 which is carried by the side frame member 52 serves to support for rotary movement the block 108 which cannot move axially since it is confined between bearing 100 and level gear 96 which meshes with bevel gear 94. An elongated screw member 114 is threaded through the block 108 so that in response to rotation thereof in one direction or the other the screw 114 will be moved in one direction or the other along its axis, and this screw 114 is pinned at 116 to a horizontal flange 84b of the guide bar 84 which has a vertical flange 84a, as indicated in FIG. 8, so that the guide bar 84 is of a T-shaped cross section. An identical guide bar 84 is situated at the other side of the machine and is oriented with its vertical flange 84a directed toward the vertical flange 84a of the guide bar which is connected to the screw 114, as is apparent from FIG. 7. There are four assemblies similar to those which cooperate with the screw 114. Thus, it will be seen that the side frame members 52 carry four bearing units 100 and that the bevel gear 104 surrounds and is threadedly connected with a screw 118 which is pinned to the same flange as the screw 114, so that the screws 118 and 114 move together along their axis in order to adjust the guide bar 84 connected to these screws transversely of the direction of travel of the carton B.

The shaft 88 extends completely across the machine beneath the slide plate 26 so that when the operator turns the handcrank 86, not only are the pair of bevel gears 94 and 96 actuated, but in addition the rotary shaft 88 serves to actuate the gear transmission 120 which is identical with the transmission which drives the screw 114 and which serves to act on a screw 122 which is pinned to the flange 84b of the other guide bar 84, in the manner shown in FIG. 7. The transmission 120 drives a shaft 124 which performs the same function as the shaft 98 at the other side of the machine, and this shaft 124 drives a gear transmission unit 126 identical with the unit 120 but serving instead to drive a screw 128 which is also pinned to the horizontal flange 84b of the same guide bar 84 as that to which the screw 122 is pinned.

The threads of the screws 122 and 128 are of a hand opposite to the thread of the screws 114 and 118, so that in response to rotary movement of the hand wheel 86 the pair of guide bars 84 will simultaneously move toward or away from each other through equal distances, and thus it is possible to orient the side faces of the flanges 84a which are directed toward each other with respect to the exterior side surfaces of the carton which is to be transported so that the guide means will serve to accurately guide a carton along its predetermined path of travel in response to movement of a pusher bar 28 from left toward right, as viewed in FIG. 7.

Referring to FIG. 9, the orientation of the vertical flanges 84a of the bars 84 with respect to the exterior side surfaces of a carton B is clearly illustrated. The manner in which the carton B rests on the slide plate 26 is also clearly apparent, and FIG. 9 further shows a pusher bar 28 engaging the trailing end $j$ of the illustrated carton B and moving over the slide plate 26. FIG. 9 further shows part of the supporting structure 26a for the slide plate 26.

As is indicated in FIG. 9, the flanges 84b serve not only to provide connections between the guide means and the adjusting structure therefor, but in addition these flanges serve to carry the adhesive-applying units. Thus, the right flange 84b of FIG. 9 carries a standard 130 which carries a bracket 132 on which the adhesive-applying unit 34 is mounted. This standard 130 is fixedly mounted at its bottom end in a socket 136 which is fixed directly to the flange 84b and which is also fixed to a horizontal rod 138 which passes slidably through a sleeve 140. This sleeve 140 is fixed to a plate 142 which is fixed to the side frame member 52 in the manner shown in FIG. 9, and at its bottom end the plate 142 is fixed with a second sleeve 144 whose axis is parallel and situated directly beneath the axis of the sleeve 140. The rod 138 is fixed with a vertically extending bar 146 which is fixed at its bottom end to a second rod 148 which extends slidably through the lower sleeve 144, and at its inner end this rod 148 fixedly carries a bracket 150 on which the lower adhesive-applying unit 38 is mounted. In the same way, the left bar 84 of FIG. 9 carries identical structure for supporting the upper adhesive-applying unit 36 and the lower adhesive-applying unit 40. A transverse bar 154 is indicated in FIGS. 7 and 11. This bar 154 extends through a bracket on bar 30 and extends slidably through both bores of the brackets 132, so that through this bar 154 the pair of upper brackets 132 are constrained to be situated at all times at the same elevation along the pair of standards 130.

As is indicated in FIG. 9, the right side of the carton B engages the actuating portion 156 of a microswitch 158, while the left side of the carton B engages an actuating portion 160 of a microswitch 162. Therefore, in the position of the parts shown in FIG. 9 the box illustrated therein has progressed to a location where its sides $k$ and $l$ have engaged and closed the microswitches 158 and 162. These are normally open switches which automatically assume their open positions as soon as the box has moved beyond the actuating portions thereof which are of course situated in the path of movement of the carton. The microswitch 158 is fixed to the underside of a plate 164 which it will be seen rests directly on the flange 84b of the right guide bar of FIG. 9 as well as on the upper surface of a block 166 which is fixed to the upper flange 52a of the side frame member 52 in FIG. 9. The left microswitch 162 of FIG. 9 is simply fixed to the underside of a plate 168 which is fixed directly to the horizontal flange 84b of the left guide bar of FIG. 9. Therefore, the microswitch 162 has a fixed position along the path of travel of the box B.

Referring to FIG. 10, it will be seen that the actuating portion 160 of the microswitch 162 is situated precisely in a vertical plane P which extends transversely across the machine normal to the direction of travel of the box B. It is precisely in this plane that all of the adhesive-applying units are situated, and while the units 34 and 38, on the one hand, and the units 36 and 40, on the other hand, will move toward and away from each other together with the guide bars 84 of the guide means, they will nevertheless remain at all times in the plane P so that with respect to the direction of travel of the box the adhesive-applying units and the actuating portion 160 of the microswitch 162 have a predetermined position which remains unchanged. These elements change their position only transversely of the path of movement of the box.

As may be seen from FIG. 10, the plate 164 is formed with an elongated slot 170 receiving a roller 172 which is supported for rotary movement about a vertical axis by the stationary block 166 carried by the flange 52a and on which the plate 164 rests for free movement both longitudinally and transversely as indicated by the double-headed arrows shown at the lower left of FIG. 10. Thus, while the axis of the roller 172 is fixed the slot 170 is capable of shifting along the roller 172 together with the plate 164. This plate is formed with a second slot 174 which receives a roller 176 which is carried by the flange 84b on which the plate 164 rests, and this roller 176 also has a vertical axis which does not change its position in the direction of travel of the box although of course it is capable of moving inwardly toward and outwardly away from the path of movement of the carton together with the lower guide rail 84 shown in FIG. 10. The slots 170 and 174 include a 45 degree angle between themselves to that these slots respectively extend along the hypotenuse and one leg of a right triangle which has a pair of 45 degree angles, so that as a result of the extent of lateral movement of the guide rail 84 on which the plate 164 rests will also provide an equal extent of longitudinal movement of the plate 164 relative to this guide rail so that the microswitch 158 is always shifted longitudinally either in the direction of movement of the carton or in the direction opposed to the direction of movement of a carton by the same distance that the guide rail 84 on which the plate 164 rests is moved inwardly toward or outwardly away from the path of movement of the carton.

Situated on the other side of the plane P from the plate 164 is a second plate 178 which is formed with an elongated slot 180 receiving a roller 182 carried by a block 184 on which the plate 178 rests so as to be slidable therealong either longitudinally or transversely as shown by the double-headed arrows at the lower part of FIG. 10 but at the right end thereof. The block 184 is fixedly carried by the flange 52a in the same way as the block 166. The plate 178 is also formed with an elongated slot 186 receiving a roller 188 carried by the same flange 84b which carries the roller 176. Therefore, these slots 180 and 186, which also extend respectively along the hypotenuse and leg of a 45 degree right triangle will provide for the plate 178 a movement which is of the same extent as but opposite to the direction of movement of the plate 164 in response to adjustment of the guide means to the particular width of the box.

The plate 178 carries a third microswitch 190 which has an actuating portion 192 situated in the path of movement of a box from left to right, as viewed in FIG. 10, and it will be noted that the actuating portion 192 is situated by a distance $w/2$ to the right of the plane P while the actuating portion 156 of the microswitch 158 is situated by the same distance $w/2$ to the left of the plane P. The distance $w$ indicates the transverse distance between the pair of guide bars 84, which is to say the width of the box which is being treated, and the distance of $w/2$ is therefore equal to one half the distance between the pair of guide bars or one half the width of the box. Therefore, with the structure illustrated in FIG. 10 the pair of camming plates 164 and 178 form an automatic adjusting means which automatically shift the microswitches 158 and 190 through equal and opposite distances in the longitudinal direction, and the distance through which each of the microswitches 158 and 190 is automatically moved in the longitudinal direction is equal to the distance that the rail which carries the rollers 176 and 188 moves in a transverse direction, as a result of the 45 degree right triangle arrangement of the camming slots of the plates 164 and 178. Since there are a pair of guide rails moving equally and oppositely each other, then the actual extent of movement of the microswitches 158 and 190 is equal to one half the total change in the distance between the pair of guide rails.

The significance of the relationships discussed above and as shown in FIG. 10 will appear from the description which follows.

FIGS. 11–13 show the details of each of the adhesive-applying units. While these details will be described in connection with the unit 34, it is to be understood that the remaining adhesive-applying units are identically constructed. Referring to FIGS. 11–13 it will be seen that a clamping plate 194 serves to clamp to the bracket 132 the elongated tubular housing 196 of the adhesive-applying unit 34. This elongated tubular housing 196 has a flat face 198 (FIG. 13) adapted to slidably engage the inner surface of the flap to which the adhesive is to be applied, and at its wall which is provided with the flat outer face 198 the tubular housing 196 is formed with a series of vertically arranged discharge openings 200. The tubular housing 196 has a closed bottom end 202.

Situated turnably and coaxially within the housing 196 is an elongated tubular valve sleeve 204 formed with a series of openings 206 which are situated at the same elevations as the several openings 200, respectively, but when the valve sleeve 204 is turned to the position illustrated in FIG. 13, where the openings 206 are out of alignment with the openings 200, the valve sleeve 204 serves to close the openings 200 and no adhesive will discharge through these openings 200. On the other hand, the valve sleeve 204 is capable of being turned to an open position where the openings 206 are in alignment with the openings 200, respectively, and in this open position it is possible for an adhesive such as glue, for example, to discharge through the openings 200.

The valve sleeve 204 fixedly carries an actuating pin 208 which extends to the exterior through a slot 210 (FIG. 11) formed in the outer housing 196, and this slot 210 has a length and angular position which places the valve sleeve 204 in its open and closed positions when the pin 208 engages the ends of the slot 210. This pin 208 is received in an opening of a piston rod 212 connected to a piston which is slidable in an air cylinder 214 fixedly mounted on the bracket 132 and supplied with compressed air through one or the other of the conduits 216 which are adapted to be alternately placed in communication with a source of compressed air in a manner described below. Thus, by alternately supplying compressed air to the conduits 216 the piston in the cylinder 214 will be shifted and the piston rod 212 will move to turn the pin 208 and thus rotate the valve sleeve 204 about its axis so as to place the adhesive-applying unit either in its open or in its closed positions.

The liquid adhesive is supplied to the unit through a conduit 218 which communicates with any suitable source of liquid adhesive, and this conduit 218, which is flexible, is fluid-tightly connected with an elongated tube 220 which is situated slidably within the valve sleeve 204, in the manner shown in FIG. 12. A fitting 222 is carried by the housing 196 at its top end and it is capable of being loosened and tightened so as to adjust the elevation of the tube 220 within the valve sleeve 204. This tube 220 has an open bottom end which according to its elevation will leave a certain number of openings 206 starting from the bottom of the valve sleeve, as viewed in FIG. 12, uncovered, so that it is only through these uncovered openings 206 that adhesive will be capable of issuing through openings 200 aligned with the uncovered openings 206. The tube 220 will maintain those openings 206 closed which are overlapped by the tube 220, irrespective of the angular position of the valve sleeve 204. Therefore, by adjusting the axial position of the tube 220 within the valve sleeve 204 it is possible to determine the width of the area along which the adhesive will be distributed. The tube 220 is provided at its exterior with lines 224, some of which are visible in FIG. 12, and by situating these lines in alignment with the top of the fitting 222, for example, it is possible for the operator to determine how many of the openings 206 are uncovered by the tube 220 and thus how wide the area across which the adhesive will be distributed.

An adhesive-applying structure of the same general type as that shown in FIGS. 12 and 13 is also disclosed in U.S. Patent No. 2,796,847.

The bracket 132 of FIG. 11 carries a pair of guide plates 226 fixed to the bracket by screws 228 with a space 230 therebetween, and these plates converge in the direction of travel of the box so as to guide the flaps to which the adhesive is to be applied past the adhesive-applying means with the surfaces of the flaps properly situated to receive the adhesive. The manner in which the converging guides of the several units cooperate with the flaps is most clearly apparent in FIG. 9.

Referring now to FIGS. 14–18, the sequence of operations which take place in connection with the adhesive-applying means is illustrated therein. As may be seen from FIG. 14 as the box B is transported along its path of movement by the pusher bar 28 which engages the trailing end of the box, the side flaps c and d will respectively approach the pair of adhesive-applying units 34 and 36, and in the same way the lower side flaps will approach the lower adhesive-applying units, respectively. Insofar as the microswitches are concerned, it will be seen from FIG. 14 that as the box approaches the plane P where all of the adhesive-applying units are located, the leading end i of the box will engage the actuating portion 156 of the microswitch 158 so as to close this microswitch. The closing of the microswitch 158, however, merely conditions the circuit for a future operation to take place when the microswitch 158 opens, and when the microswitch 158 is initially closed, nothing happens and the adhesive-applying means remains closed. It is not until the leading end i of the box engages the actuating portion 160 of the switch 162 so as to close the latter that the adhesive-applying means is opened, and this is the position of the parts shown in FIG. 15. The leading end of the box has just closed the microswitch 162 and the several adhesive-applying units have been automatically moved to their open positions applying glue to the inner surface portions of the outer flaps which will subsequently become located over the inner flaps. The transporting means continues to transport the box beyond the position as shown in FIG. 15 so that it approaches the position shown in FIG. 16 where the leading end i of the box will now close the microswitch 190 by engaging the actuating portion 192 thereof. The closing of the switch 190 will serve in a manner described below to close the adhesive-applying means so that the application of adhesive will terminate, and it will be noted that the application of adhesive terminates after the flaps which extend in the direction of travel of the box have been provided with adhesive along a distance equal to the dimension of the transverse flaps in the direction of travel, so that no glue will become situated over the gap between the transverse flaps such as the pair of transverse flaps a and b. Now as the box continues to travel the adhesive-applying means remains closed with the parts remaining in the position indicated in FIG. 16, until the trailing end j of the box moves beyond the actuating portion 156 of the switch 158, and now the switch 158 opens so as to bring about a second opening of the adhesive-applying means so that again the adhesive commences to be applied to the inner faces of the flaps which extend in the direction of travel. It is to be noted that this second application of adhesive commences precisely at a distance from the trailing end equal to the width of the inner trailing flaps b and f, and this latter width is of course equal to the dimension of the trailing transverse flaps in the direction of travel of the box.

The adhesive-applying means will now remain open as the trailing end of the box approaches the plane P where the adhesive-applying means is located, and just before the end j of the box reaches the plane P the adhesive-applying means is again closed. Of course, it would be possible to bring about closure of the adhesive-applying means by opening of the microswitch 162, but in this event the inertia of the components would continue the discharge of at least some adhesive which would simply drop to the floor and perhaps fall on some of the apparatus, rendering subsequent operations extremely inconvenient. In order to avoid this result it is the closing of the microswitch 82 by the cam 78 which brings about the final closing of the adhesive-applying means just before the trailing end of the box reaches the plane P, so that in this way the adhesive-applying means will be fully closed by the time the trailing end of the box reaches the plane P, and thus there will be no danger of dropping of adhesive onto the apparatus or the floor. It has been found in practice that if the cam 78 is timed to close the switch 82 at about the instant when the pusher bar 28 which engages the trailing end of the box is one quarter inch from the plane P, the adhesive-applying means will be reliably closed by the time the trailing end of the box reaches the plane P and at the same time proper distribution of the adhesive at the trailing areas of the inner surfaces of the flaps which extend in the direction of travel will be provided.

The pneumatic and electrical circuitry for bringing about the operations described above in connection with FIGS. 14–18 is illustrated in FIG. 19.

FIG. 19 diagrammatically illustrates the several pneumatic cylinders 214 of the several adhesive-applying units, and the piston rods 212 are also schematically indicated as well as the pistons 232 to which they are respectively connected and which are respectively slidable in the cylinders 214. The several pistons 232 are retracted to their positions closing the several adhesive-applying units when air under pressure is supplied to the cylinders 214 through the conduit system 236. At this time the conduit system 234 is connected to the outer atmosphere so that all of the pistons are retracted and the several adhesive-applying units are closed. When the conduit system 236 is connected to the atmosphere and air pressure is supplied to the cylinders through the conduit system 234 the pistons 232 are displaced outwardly so as to cause the piston rods 212 to open the several units simultaneously. The control for the pair of conduit systems which are alternately supplied with air under pressure from a suitable compressor is brought about by a known type of slide valve assembly 238 which is controlled through a pair of solenoids 240 and 242. When the solenoid 240 is energized the air under pressure is delivered through the conduit system 236 to the several cylinders 214 so as to retract the pistons to their positions closing the adhesive-applying units, while when the solenoid 242 is energized air under pressure will flow through the conduit system 234 into the several units so as to displace the pistons outwardly to their positions opening the several adhesive-applying units.

The electrical structure for controlling the energizing of the solenoids 240 and 242 includes the conductors 246 and 248 which are respectively connected to any suitable source of power. The conductor 248 is shown, in the illustrated rest position of the parts where a master switch is simply turned on but otherwise no carton is being sealed, electrically connected with the conductor 250 through the switch 158. This conductor 250 is in turn electrically connected through the switch 162 with the conductor 252 which is electrically connected through the conductor 254 with a solenoid 240 which in turn is electrically connected permanently with the conductor 246, so that at this time it is the solenoid 240 which is energized and of course the pistons are now retracted and all of the adhesive-applying units are closed. The solenoid 242 is unenergized at this time because of the position of the switch 162.

As was pointed out above in connection with FIG. 14, the first operation which takes place is the closing of the switch 158 by the leading end of the box, but it will be seen from FIG. 19 that at this time the only result which will follow from this operation is that the conductor 248 will communicate with the conductor 250 through the conductor 256 and the switch 190 rather than directly through the switch 158.

The switch 158 will remain, however, in its position electrically interconnecting the conductors 248 and 256 when the leading end of the box closes the switch 162, as indicated in FIG. 15, and now the conductor 250 will communicate through the switch 82 with the solenoid 242, while at the same time the actuation of the switch 162 has cut off the supply of current to the solenoid 240, so that now the slide valve 238 is actuated to supply the air under pressure to the conduit system 234 which results in opening of the adhesive-applying means, as pointed out above, so that now the adhesive starts to be applied in the manner indicated in FIGS. 15 and 16.

As may be seen from FIG. 16, the next operation is the closing of the switch 190 by the leading end of the box. As may be seen from FIG. 19, this will result in deenergizing of the solenoid 242 and a second energizing of the solenoid 240, the switch 158 of course remaining in its closed position since the trailing end of the box has not yet reached the switch 158, and thus the parts will return to their initial position where the adhesive-applying means is closed and the application of adhesive is terminated.

As the box continues to be transported along its predetermined path of movement the trailing end j approaches and moves beyond the actuating portion of the switch 158 so that this switch returns to its open position as shown in FIGS. 17 and 19, and at this time since the switch 162 is still closed the return of the switch 158 to its initial position will result in energizing of the solenoid 242, so that the opening of the switch 158 by the trailing end of the box again starts the supply of adhesive by the automatic opening of the plurality of adhesive-applying units, and thus adhesive is applied to the trailing inner area portions of the flaps which extend in the direction of travel of the box.

As was pointed out above in connection with FIG. 18, just before the trailing end of the box reaches the plane P the cam 78 will actuate the switch 82, and this will result, as shown in FIG. 19, in deenergizing of the solenoid 242 and energizing of the solenoid 240, so that the parts will again return to the position where the adhesive-applying means is closed.

The cam 78 is designed to maintain the switch 82 in its closed position until the trailing end of the box moves beyond the plane P. In orther words, the closing of the switch 82 takes place so close to the moment when the trailing end of the box reaches the plane P, on the order of a distance of one quarter of an inch before the trailing end of the box reaches the plane P, as pointed out above, that the switch 162 will return to its open position indicated in FIG. 19 before the switch 82 returns to the position thereof as shown in FIG. 19, so that it is not possible for the solenoid 242 to become energized for a second time by opening of the switch 82. Thus, before the cam 78 moves beyond the switch 82 the trailing end of the box will have moved beyond the actuating portion 160 of the switch 162, and thus the adhesive-applying means will remain closed as the box moves beyond the machine of the invention.

As indicated above, the fact that the actuating portions 156 and 192 of the switches 158 and 190 are situated before and after the plane P by a distance which is equal to one half the distance between the guide rails 84 is of a special significance. With the particular carton B shown the inner flaps a and b at the supper part of the box each have transversely of the direction of travel of the box a dimension which is twice the dimension of each flap a and b in the direction of travel of the box. The same of course applies to the lower pair of inner flaps e and f. In butt flap cartons, side flaps c and d meet at the center of the carton, so that the height of flaps c and d equals ½ the carton width or w/2. Since the end flaps a and b are the same height as the side flaps c and d due to the common method of manufacture, the length of the end flaps is w/2. See FIGS. 22 and 23. Therefore, when the leading end i of a carton B reaches the plane P and actuates the switch 162 so as to commence the application of adhesive, this application of adhesive will continue while the carton travels for a distance equal to one half the distance between the pair of guide rails, since it is this distance of one half the width of the carton which is equal to the dimension of the flap a and the lower leading inner flap e in the direction of carton travel. Thus, when the leading end i of the carton actuates the switch 190 to terminate the application of the adhesive the inner side surfaces of the flaps which extend in the direction of travel will have automatically been provided with adhesive over an area substantially equal to that which will be covered on the inner flaps by the outer flaps when the carton is closed. Inasmuch as the dimensions of the trailing inner flaps b and f are the same as those of the leading inner flaps, the starting of the second application of adhesive by movement of the trailing edge or end j of the carton beyond the switch 158 will precisely start the second application of adhesive along an area which will overlap the trailing inner flaps when the outer flaps are folded against the inner flaps. Of course, the approach of the pusher bar 28 to a location quite close to the plane P will actuate the switch 82 so as to terminate the second application of adhesive in the manner described above.

There are several important points about this type of control of the adhesive-applying means. In the first place the dimension of the gap between the leading and trailing inner flaps $a$ and $b$ at the upper part of the box and of course the leading and trailing inner flaps $e$ and $f$ at the lower part of the box makes absolutely no difference. Whether this gap is long or short in the direction of travel of the box the structure will automatically operate to start and stop the application of adhesive at precisely the right times. Furthermore, the particular length of the box in the direction of travel is also of no moment since the final termination of the application of adhesive will be determined by the location of the pusher bar 28 at a distance on the order of one quarter of an inch from the plane P, and this factor is uninfluenced by the total length of the box. Therefore, the possible variations in the total length of the box, considered in the direction of travel thereof, or the variation in length of the gap between the transverse inner flaps of the box will have no influence on the structure.

However, of even greater significance is the fact that whenever the distance between the pair of guide rails 84 which form the guide means is manually adjusted, the automatic adjusting means formed by the cam plates 164 and 178 together with the rollers which cooperate with the latter in their slots will automatically position the switches 158 and 190 from the plane P at precisely one half the distance between the pair of guide rails. Of course, if there were one peculiar box of peculiar dimensions different from any other box and having the inner transverse flaps whose dimension in the direction of travel was one half the dimension in a direction transverse to the direction of travel, then of course there would not be too much point to the structure shown in the drawings and described above since it would be a very specialized structure designed for one particular box. However, the fact is that almost all boxes of the general type described above and shown in the drawing have flaps $a, b, e, f$ whose dimension in the direction of travel of the box is one half the width of the box. This is an almost universally followed ratio. Practically every inner flap of every box of the general type referred to above and shown in the drawings, and this type of box is very widely used, has inner transverse flaps whose dimensions in the direction of travel are one half their dimensions transversely of the direction of travel or in other words one half the width of the box. As a result it becomes possible with the structure of the invention to automatically adjust the adhesive-applying means whenever the distance between the guide rails is adjusted to accommodate a box of a width different from that which has been treated previously. Therefore, whenever with the structure of the invention a change is made from a box of one size to a box of another size the operator need not be concerned at all with adjustments of the adhesive-applying means since these adjustments are automatically carried out. All that the operaor need do is acuate the simple manual adjustment of the distance between the guide rails and the adjustment of the adhesive-applying means takes care of itself.

As was pointed out above, the use of camming slots in the cam plates 164 and 178 which are arranged along the hypotenuse and legs of 45 degree right triangles is particularly suited for the disclosed structure where both of the guide rails 84 move equally and oppositely toward and away from each other, since in this way the movement of the plates 164 and 178 in the direction of box travel by a distance equal to the transverse movement of one of the guide rails 84 will precisely displace the switches 158 and 190 by a distance equal to one half the total extent of the change in the distance between the pair of guide rails.

FIGS. 20 and 21 show another embodiment of the invention which in some respects is simpler than that described above. Thus, as may be seen from FIG. 20, the illustrated embodiment includes the microswitch 162 whose actuating portion 160 remains at all times in the plane P in which all of the adhesive-applying units are situated, and to the right of this plane P is situated the switch 190 with its actuating portion 192 and camming plate 178 which is automatically controlled in response to displacement of the bars 84 toward and away from each other precisely as described above. However, with the embodiment of FIGS. 20 and 21 there is no second camming plate 164 with all of the structure associated therewith, and in particular the additional cam 78 and switch 82 for terminating the application of adhesive just before a pusher bar 28 reaches the plane P is also eliminated. Instead, all of these structures which are omitted in the embodiment of FIG. 20, as compared with the embodiment of FIGS. 10 and 19, is combined into the control assembly shown at the lower left portion of FIG. 20. This control assembly includes a switch 260 which performs the function of both of the switches 168 and 82. The microswitch 260 is fixedly carried by the guide rail 84 shown at the lower part of FIG. 20, so that the switch 260 itself moves transversely with respect to the direction of travel by a distance equal to one half the total extent of change in the distance between the bars or guide rails 84. Of course, with the embodiment of FIG. 20 the manually operable adjusting means for adjusting the bars 84 is retained so that both of the bars 84, when manually adjusted to a box width which is different from that of the previously treated box will move equally and oppositely in a direction transverse with respect to the direction of box travel. Therefore, the switch 260 will in of itself move transversely of the direction of travel by a distance equal to one half the total extent in the change of the distance between the pair of bars 84 which form the guide means for the box. The switch 260 has an actuating portion 262 adapted to be actuated by a rotary cam 264 which is carried by a shaft 266 for rotation, this rod or bar 266 itself being supported in a suitable bearing carried by the slide frame member 52. The sprocket structure 268 rotates the cam 264 so that it will turn through a single revolution during each cycle of operations, and it will be recalled that the cycle of operations was completed by the time that one pusher bar 28 moved through the distance between the pair of pusher bars. Thus, during the travel of a point of the endless chains which carry the pusher bars through a distance equal to that between the pair of pusher bars the shaft 266 and the cam 264 therewith turn through a single revolution. This cam 264 is a section of a right cylinder and has an exterior surface 270 which forms a part of a right cylinder whose axis coincides with that of the shaft 266. However, part of the cylinder is cut away so as to leave it on one side with the inclined edge 272 and on the other side with a straight axially extending edge 274 which extends parallel to the axis of the cylinder of which the surface 270 forms a part. The location of the edge 274 of the cam is such that it rides off and releases the actuating portion 262 whenever a pusher bar 28 is approaching the plane P and situated from the latter by a distance on the order of one quarter inch, so that the movement of the axial edge 274 of the cam off the actuating portion 262 will terminate the application of glue just before the trailing end of the box reaches the plane P, and thus with this embodiment also there will be no danger of excessive glue or other adhesive spilling over the parts or on the floor. The leading edge 272 of the camming surface 270 will engage the actuating portion 262 of the switch 260 at different times during each cycle depending upon the position of the bars 84 transversely with respect to the direction of box travel. If the relative distance between the bars 84 is great, then the actuating portion 262 will be situated nearer to the wider end of the cam 270 so that the switch 260 will be engaged at a time during each cycle which is sooner than the time when the switch 260 is engaged if the distance between the bars 84 is relatively small so that the actuating portion 262 is adjacent a narrow end of the cam 264. The design of the edge 272 is such that irrespective of the adjustment of the guide bars 84 the switch 260 will automatically be actuated when the trailing end of the box is situated in advance of the plane P, to the left thereof as viewed in FIG. 20, by a distance equal to one half the width of the box. Therefore, with the cam 264 it is possible on the one hand to automatically start the second application of adhesive precisely when the trailing end of the box is situated from the plane P, while approaching the latter, by a distance equal to one half the width of the box, and to terminate the application of adhesive just before the trailing end of the box reaches the plane P.

As may be seen from FIG. 21, the pneumatic structure is identical with that of FIG. 19 and is controlled by the same solenoids and slide valve 238. Also, the switches 162 and 190 are used, although they are situated in a different electrical circuit which includes the single microswitch 260 actuated by the cam 264. The circuit shown in FIG. 21 includes the conductors 280 and 282 which are connected to the line or other source of current, and it will be noted that the conductor 280 is connected through the switch 162, which is in its off position, to the conductor 282 which thus places the solenoid 240 in the electrical circuit so that with the parts shown in the position of FIG. 21 the pistons 232 are retracted and the adhesive-applying units are closed. When the leading end of the box actuates the switch 162 so as to close the latter, the conductor 280 becomes electrically connected through the switch 162 with the conductor 284 which through the open switch 190 places the solenoid 242 into the circuit so as to displace the pistons 232 in order to open the several adhesive-applying units. These units will remain open until the leading end of the box closes the switch 190 which it will be noted will now connect to the conductor 284 to the conductor 286 which is at this time connected through the switch 260 with the solenoid 240, so that this solenoid now becomes energized and the pistons are retracted to terminate the application of adhesive.

The adhesive-applying units will be maintained closed until the edge 272 of the cam 264 engages the switch 260 so as to displace the latter from the illustrated open position to its closed position where the conductor 286 is placed by the switch 260 in electrical connection with the conductor 288, and thus the solenoid 240 will become unenergized while the solenoid 242 will again be energized to again start the application of adhesive. This operation will continue until the trailing edge 274 of the cam moves beyond the switch 260 so that it returns to its open position shown in FIG. 21 where the solenoid 240 is again energized so as to retract the pistons 232 and thus terminate the application of adhesive.

While the embodiment of FIG. 20 may be considered somewhat simpler in that there are less switches and cam plates, nevertheless because of the relatively complex structure of the cam 264 the embodiment requiring the pair of switches 82 and 158 as well as the cam 78, which is far simpler than the cam 264, and of course the second camming plate which also is far simpler than the cam 264 may be preferred. Although more elements are involved they are of a less complex construction than the cam 264 which must be carefully constructed so as to provide the proper actuation of the switch 260 in the manner described above.

However, with either of the above-described embodiments of the invention it will be possible to adjust automatically the starting and stopping of the adhesive application simply in response to adaptation of the distance between the guide rails 84 to the width of a particular box.

What is claimed is:

1. In a carton sealing apparatus, transporting means for transporting in a given direction along a predetermined path a carton which has at least one pair of outer flaps which are required to be adhesively secured to one pair of inner flaps, normally closed adhesive-applying means situated along said path for applying adhesive to at least two of said flaps during movement of said carton along said path, adjustable control means operatively connected to said adhesive-applying means for opening the latter to initiate the application of adhesive and for closing said adhesive-applying means to terminate the application of adhesive, adjustable guide means for guiding a carton for movement along said path, said guide means being adjustable transversely of said given direction, adjusting means operatively connected to said guide means for adjusting the latter transversely of said given direction to accommodate said guide means to the dimension of a carton transversely of said given direction, and automatic adjusting means responding to adjustment of said guide means and operatively connected to said control means for automatically adjusting the latter to control the opening and closing of said adhesive-applying means in accordance with the adjustment of said guide means 2. In an apparatus as recited in claim 1, the said adhesive-applying means being situated at a predetermined location along said path which remains the same in said given direction irrespective of the adjustment of said guide means and control means.

3. In an apparatus as recited in claim 1, said control means including an actuating portion situated in the path of movement of a box to be engaged and moved by a box for actuating said control means, so that unless a box is transported along said path, said control means will not be actuated.

4. In an apparatus as recited in claim 3, said automatic adjusting means being operatively connected to said actuating portion of said control means for adjusting the location of said actuating portion of said control means along said path.

5. In an apparatus as recited in claim 1, one of said pair of flaps extending transversely of said given direction and having in said given direction a dimension which is a predetermined fraction of its dimension transversely of said given direction, said automatic adjusting means adjusting the said control means to an extent which is equal to said predetermined fraction of the adjustment of said guide means transversely of said given direction by said manually operable adjusting means 6. In an apparatus for treating boxes, transporting means for transporting in a given direction along a given path a box which has a pair of outer flaps which are required to be adhesively secured to a pair of inner flaps, one of said pairs of flaps extending transversely of said given direction and each having in said given direction a dimension which is at least approximately one half its dimension transversely of said given direction, normally closed adhesive-applying means situated along said path for applying adhesive to at least two of said flaps, control means operatively connected to said adhesive-applying means for opening the latter to initiate the application of adhesive and for closing said adhesive-applying means to terminate the application of adhesive, guide means extending along said path for guiding a box for movement along said path, said guide means being adjustable transversely of said path and said control means being adjustable in said given direction along said path, guide adjusting means operatively connected to said guide means for adjusting the latter transversely of said path to accommodate said guide means to the dimension of a box transversely of said given direction, and automatic adjusting means operatively connected to said control means and responding automatically to adjustment of said guide means for adjusting the location of said control means in said given direction to an extent which is at least approximately equal to one half the extent of adjustment of said guide means transversely of said path by said adjusting means 7. In an apparatus as recited in claim 6, said control means including an actuating portion situated in the path of carton movement to be engaged and actuated directly by a carton as it is transported into said given direction along said path, and said automatic adjusting means including a cam carrying said actuating portion of said control means and operatively connected to said guide means to respond to adjustment thereof for changing the location of said actuating portion of said control means along said path.

8. In an apparatus as recited in claim 7, said cam including a plate formed with a pair of slots which respectively extend along the legs of a right triangle and respectively receiving a pair of pins one of which is stationary and the other of which is fixed to said guide means for movement therewith so that motion is transmitted to said cam plate through said pin fixed to said guide means for shifting said cam plate with respect to said fixed pin so as to change the location of said actuating portion of said control means along said path.

9. In an apparatus as recited in claim 8, said guide means including a pair of rails extending in said given direction along said path and both simultaneously movable in equal and opposite directions, respectively, with respect to a center line along which a box is transported by said transporting means, said plate having said slots extending respectively along the hypotenuse and one leg of a 45 degree right triangle and said pin which is fixed to said guide means being fixedly carried by one of said guide rails for movement transversely of said given direction by a distance equal to one half the total extent to which said guide means is adjusted, so that the extent of adjustment of said plate in said given direction will equal the extent of adjustment of one of said guide rails transversely of said given direction to shift said actuating portion of said control means along said path to an extent equal to one half the total extent of adjustment of said guide means.

10. In an apparatus as recited in claim 9, said guide adjusting means including a screw transmission operatively connected to said guide rails for shifting the latter toward and away from each other.

11. In an apparatus for sealing cartons, transporting means for transporting in a given direction along a predetermined path a carton which has outer flaps required to be adhesively secured to inner flaps for closing the carton, normally closed adhesive-applying means situated at a given location along said path for applying adhesive to at least two flaps of the carton and control means operatively connected to said adhesive-applying means for opening the latter to initiate the application of adhesive and for closing the latter to terminate the application of adhesive, said control means including at least one actuating portion situated in the path of movement of a carton at the location of said adhesive-applying means to be engaged by a leading end of the carton as it is transported in said given direction along said path for opening said adhesive-applying means to initiate the application of adhesive when the leading end of the carton reaches said adhesive-applying means, and said control means including at least a second actuating portion situated along said path beyond said one actuating portion to be engaged by the leading end of the carton subsequent to engagement of said one actuating portion by said leading end of the carton after said adhesive-applying means has been opened, said second actuating portion when engaged by the leading end of the carton automatically actuating said control means to terminate the application of adhesive by closing said adhesive-applying means.

12. In an apparatus as recited in claim 11, guide means for guiding a carton along said path, said guide means being adjustable transversely of said path, adjusting means operatively connected to said guide means for adjusting the latter transversely of said path to accommodate said guide means to the dimension of a box transversely of said given direction, and automatic adjusting means operatively connected to said guide means to respond automatically to adjustment thereof, said automatic adjusting means being operatively connected to said second actuating portion of said control means for adjusting the location of said second actuating portion with respect to said one actuating portion of said control means in said given direction in accordance with the adjustment of said guide means transversely of said path.

13. In a box treating apparatus as recited in claim 12, said adhesive applying means being carried by said guide means for movement therewith so as also to be accommodated to the dimension of a box transversely of said path, and said adhesive-applying means applying adhesive to inner faces of a pair of outer flaps which extend in said given direction, said inner flaps including leading and trailing inner flaps which extend transversely of said given direction, said leading inner flap having a leading end coinciding with the leading end of said box and a trailing end situated from said leading end of said box by a distance at least approximately equal to the distance of said second actuating portion in advance of said one actuating portion of said control means, so that application of adhesive to said inner faces of said outer flaps will terminate at least approximately when sufficient adhesive has been applied to extend from said leading to said trailing edges of said leading inner flaps, and additional actuating means operatively connected to said control means for actuating the latter to again open and close said adhesive-applying means to apply adhesive to portions of said inner faces of said outer flaps which subsequently become located against said trailing inner flap.

14. In an apparatus as recited in claim 13, said additional actuating means including a third actuated portion situated along said path in advance of said one actuating portion and responding to movement of the trailing end of the box beyond said third actuating portion to again open said adhesive-applying means, the distance along said path of said third actuating portion from said one actuating portion of said control means being at least approximately equal to the distance between leading and trailing edges of said trailing inner flap, and cam means responding to approach of the trailing end of said box to said location of said adhesive-applying means for again actuating said control means to terminate the application of adhesive.

15. In an apparatus as recited in claim 13, said additional actuating means including a cam having a configuration which responds to adjustment of said guide means for opening and closing said adhesive-applying means a second time to apply adhesive to said inner faces of said outer flaps at areas thereof which become located against the trailing inner flap.

16. In an apparatus for treating boxes, an elongated slide plate extending in a substantially horizontal plane along a predetermined path for slidably supporting a box for movement in a given direction along said path, a pair of endless chains situated at opposite sides of said plate respectively in substantially vertical planes and each having upper substantially horizontal runs which are coextensive and which are situated at an elevation slightly higher than said plate, a plurality of transverse pusher bars extending between and fixed to said chains to be successively moved by said chains over and along said slide plate, said bars being equidistantly spaced along said chains and each being adapted to engage the trailing end of a box for pushing the latter along said plate, normally closed adhesive-applying means situated beside said plate at a predetermined location therealong for applying adhesive to at least one flap of a box, control means responding automatically to arrival of a leading end of a box at said adhesive-applying means to open the latter for initiating the application of adhesive, and means responding to the approach of each pusher bar to the location of said adhesive-applying means for closing the latter to automatically terminate the application of adhesive when each pusher bar has reached a location close to that of said adhesive-applying means.

17. In an apparatus for treating boxes, transporting means for transporting in a given direction along a predetermined path boxes which have outer and inner flaps to be adhesively secured to each other, elongated frame means extending along said path, a pair of elongated guide rails carried by said frame means and also extending along said path, at least one of said guide rails being supported by said frame means for movement transversely of said path and said guide rails being adapted to respectively engage opposed exterior side surfaces of a box to guide the latter for movement along said path in said given direction by said support means, adjusting means operatively connected to said one guide rail for adjusting the latter transversely of said path so that the distance between said guide rails can be accommodated to the dimension of a box transversely of said path, normally closed adhesive-applying means carried by said guide rails so that said adhesive-applying means also will be adjusted to the dimension of a box transversely of said path, control means operatively connected to said adhesive-applying means for opening the latter to initiate the application of adhesive and for closing the latter to terminate the application of adhesive, and automatic adjusting means operatively connected to said one guide rail for responding automatically to adjustment thereof for automatically adjusting said control means according to the position of said one guide rail transversely of said path.

18. In an apparatus as recited in claim 17, the flaps of the box including transverse flaps which have in said given direction a dimension equal to one half their dimension in a direction transverse to said given direction, and said automatic adjusting means automatically changing the location of said control means along said path to an extent equal to one half the extent of adjustment of the distance between said pair of guide rails.

19. In a box-sealing apparatus, means for transporting in a given direction along a predetermined path a box which has at least one pair of outer flaps to be adhesively secured to a companion pair of inner flaps, normally closed adhesive-applying means disposed along said path for applying adhesive to said outer flaps during movement of said box along said path, adjustable control means operatively connected to said adhesive-applying means for opening the latter to initiate the application of adhesive and for closing said adhesive-applying means to terminate the application of adhesive, transversely adjustable guide means for guiding a box for movement along said path, adjusting means operatively connected to said guide means for adjusting the latter transversely of said given direction to accommodate said guide means to the dimension of a box transversely of said given direction, and automatic adjusting means responding to adjustment of said guide means and operatively connected to said control means for automatically adjusting the latter to control the opening and closing of said adhesive-applying means in accordance with the adjustment of said guide means.

References Cited

UNITED STATES PATENTS

| | | | |
|---|---|---|---|
| 2,691,260 | 10/1954 | Schlemmer | 53—374 X |
| 2,907,153 | 10/1959 | Toles | 53—76 X |
| 3,085,376 | 4/1963 | Ferguson et al. | 53—75 |
| 3,183,639 | 5/1965 | Rodman | 53—75 |

TRAVIS S. McGEHEE, *Primary Examiner.*

U.S. Cl. X.R.

52—374; 118—8